United States Patent
Tucker et al.

(10) Patent No.: US 12,007,015 B2
(45) Date of Patent: Jun. 11, 2024

(54) DIFFERENTIAL HOUSING

(71) Applicant: Holley Performance Products, Inc., Bowling Green, KY (US)

(72) Inventors: Kyle G. Tucker, Sherrills Ford, NC (US); Jeffery D. Horton, Troutman, NC (US); Christopher R. Stein-Martin, Mooresville, NC (US); Rodney M. Sanderson, Cleveland, NC (US)

(73) Assignee: Holley Performance Products, Inc., Bowling Green, KY (US)

( * ) Notice: Subject to any disclaimer, the term of this patent is extended or adjusted under 35 U.S.C. 154(b) by 0 days.

(21) Appl. No.: 17/869,396

(22) Filed: Jul. 20, 2022

(65) Prior Publication Data
US 2023/0023967 A1    Jan. 26, 2023

Related U.S. Application Data

(60) Provisional application No. 63/224,518, filed on Jul. 22, 2021.

(51) Int. Cl.
*F16H 57/037*    (2012.01)
*F16H 48/08*    (2006.01)

(52) U.S. Cl.
CPC ........... *F16H 57/037* (2013.01); *F16H 48/08* (2013.01)

(58) Field of Classification Search
CPC ................................................... F16H 57/037
See application file for complete search history.

(56) References Cited

U.S. PATENT DOCUMENTS

| | | | | |
|---|---|---|---|---|
| 1,417,426 | A * | 5/1922 | Torbensen | B60K 17/043 |
| | | | | 301/6.5 |
| 1,846,187 | A * | 2/1932 | Coulter | B60K 17/16 |
| | | | | 74/366 |
| 7,789,584 | B2 * | 9/2010 | Frankovich | F16H 57/037 |
| | | | | 403/299 |
| D717,216 | S | 11/2014 | Dunn et al. | |
| 2015/0087461 | A1 * | 3/2015 | Jackson | F16H 48/38 |
| | | | | 475/160 |

FOREIGN PATENT DOCUMENTS

AU       2022206796 A1    2/2023

OTHER PUBLICATIONS

Www.Strangeengineering.net (ford 9" product with HD pro alum center and the HD pro aluminum differential and a specification pdf thereof) (Year: 2017).*
Chris Alstons, Chassisworks 8.8 third member, Sep. 21, 2021 (Year: 2021).*
Yukon gear and axle third member, https://www.summitracing.com/parts/yga-32138, (Year: 2017).*
U.S. Appl. No. 63/224,518, filed Jul. 22, 2021 titled Differential Housing.

* cited by examiner

*Primary Examiner* — Thomas C Diaz
(74) *Attorney, Agent, or Firm* — Dinsmore & Shohl LLP (57) ABSTRACT

Present embodiments relate to a differential case. More specifically, but without limitation, present embodiments relate to a differential case which will function with differential components of two sizes and a rear axle housing of a different intended size.

16 Claims, 6 Drawing Sheets

DIFFERENTIAL HOUSING

CLAIM TO PRIORITY

This non-provisional patent application claims priority to and benefit of, under 35 U.S.C. § 119(e), U.S. Provisional Patent Application Ser. No. 63/224,518, filed Jul. 22, 2021 and titled "Differential Housing", all of which is incorporated by reference herein.

BACKGROUND

1. Field of the Invention

Present embodiments relate to a differential housing. More specifically, but without limitation, present embodiments relate to a differential housing which will function with differential components of two sizes.

2. Description of the Related Art

A differential is a gear train in which a rotational speed of one shaft is an average of the speed of the others, or a multiple of that average. Differentials may be utilized in a vehicle to address the situation of the vehicle turning, wherein the outer wheel and tire travel farther and the inner wheel and tire travel a shorter distance and rotate at different speeds.

In building drivetrains for vehicles or retrofitting drivetrain components of existing vehicles, certain components are known to be loud and therefore less desirable for operation in the building of a vehicle. However, other components may be desirable for operation, due to the lack of noise or for performance or other reasons.

In changing components of the differential housing (or differential case), it may be desirable to provide a differential case which accepts components of different sizes so that gearing components of differing sizes may be utilized while maintaining alignment for proper function.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

The present embodiments provide for a differential case which allows for connecting to a rear axle housing of a second size. The differential case may accept components of a first size and a second size.

According to some embodiments, a rear differential case may comprise a body having a first end and a second end, the first end capable of being oriented toward a drive shaft and the second end capable of being oriented toward a rear axle, a flange at the second end of the body, the body sized to receive differential components for an 8.8 inch differential wherein the differential components are capable of being axially aligned with a 9 inch rear axle housing and, a bolt pattern formed in the flange, the bolt pattern sized to be capable of being coupled to the 9 inch rear axle housing.

According to some optional embodiments, the following features may be used along with the rear differential case or in combination with other features and the rear differential case. The differential components may include an 8.8 inch ring gear. The ring gear may have a rotational axis aligned with an axis of the rear axle housing. The differential components may further comprise a pinion gear. The rear differential case may further comprise a plurality of bosses for connection of an accessory near the first end.

According to some embodiments, a rear axle drivetrain may comprise a rear axle housing, a differential case which is capable of connection to the rear axle housing, a pinion gear, wherein a differential assembly and the pinion gear are capable of respective axial alignments within the rear axle housing, wherein the differential case is capable of receiving differential components of a first size, and the differential case is capable of connecting to the rear axle housing of a second size.

According to some optional embodiments, the following features may be used along with the rear axle drivetrain or in combination with other features and the rear axle drivetrain. The rear axle drivetrain may further comprise bearing caps which fasten to the differential case. The bearing caps and the differential components may be disposed in the rear axle housing when the differential case is fastened to the rear axle housing. The differential components may be aligned with lateral portions of the rear axle housing. The pinion gear may be aligned with a drive shaft opening of the rear differential case. The rear differential case may have at least one aperture for a jack screw.

According to some embodiments, a method of installing a differential case and rear axle housing may comprising the steps of providing the differential case of a first size and the rear axle housing of a second size diffusing from the first size, connecting the differential case and a differential assembly of a first size, positioning the differential case and the differential assembly on a rear axle housing of a second size; and, connecting the differential case to the rear axle housing wherein the differential assembly is housed within the rear axle housing.

According to some optional embodiments, the method may further comprise connecting bearing caps to the differential case. The method may comprise capturing the differential assembly between the bearing caps and the differential case.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a differential housing (or differential case)

will now be described by way of examples. These embodiments are not to limit the scope of the claims as other embodiments of a differential housing will become apparent to one having ordinary skill in the art upon reading the instant description. Non-limiting examples of the present embodiments are shown in figures wherein:

DETAILED DESCRIPTION

It is to be understood that a differential housing is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Referring now to FIGS. 1-6, a rear drivetrain assembly is provided which allows utilization of a rear axle housing of a first size and a rear differential case, or housing, of a second size to be connected together so that a differential assembly of a second size may be utilized with the rear axle housing of the first size.

Figure 1:
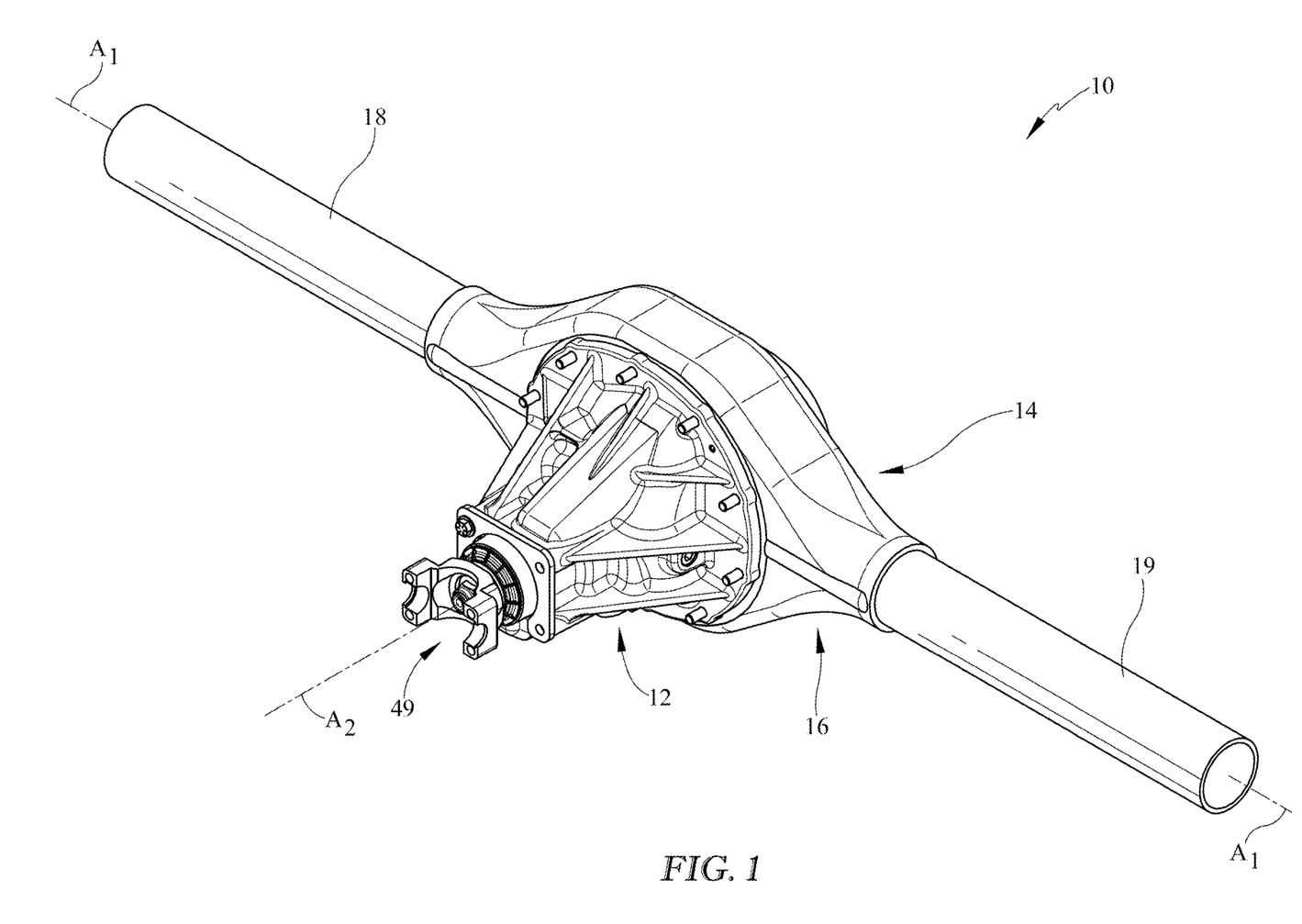
FIG. 1 is a perspective view of a rear drivetrain assembly.

Referring now to FIG. 1, a perspective view of a rear axle drivetrain 10 is depicted. The drivetrain 10 comprises a rear differential housing, also referred to as a rear differential case, 12 that is connected to a rear axle housing 14. The rear differential housing 12 may be referred to throughout the specification as a rear differential case in order to distinguish more easily between the various housings and for reasons of clarity in description. The rear differential case 12 is shown connected to a central portion 16 of the rear axle housing 14. The central portion 16 includes two lateral portions 18, 19 that each extend from lateral ends of the central portion allowing for an axle to extend from the components within the rear differential case 12 and extend out to wheels and tires of a vehicle.

As may be gleaned from the figure, a first axis $A_1$ is defined that extends through each lateral portion 18, 19, and through the central portion 16. The first axis $A_1$ extends through the wheels and a center of rotation of differential components. A second axis $A_2$ is defined extending in the forward to rearward direction through the rear differential case 12 and through the rear axle housing 14. This second axis $A_2$ is related to a rotational axis of a pinion gear and shaft.

The rear axle housing 14 may also be of a preselected size which is capable of receiving, for example, a 9 inch ring gear or what are commonly referred to as 9 inch rear differential components. The rear axle housing 14 may be also capable of receiving components of a size differing from that intended for the rear axle housing 14. In order to function with the second size, the rear differential case 12 is formed to accept components of the second size and also connect to the rear axle housing 14 formed to function with components of the first size. For example, the rear differential case 12 may receive components or a ring gear, commonly referred to as an 8.8 inch and connect to the rear axle housing 14 intend to function with components such as 9 inch rear differential components. The rear differential case 12 allows this second size component to be used with the rear axle housing 14 intended for the first size, which differs from the second size.

As discussed herein the term first size and second size are used throughout this description. Typically rear drivetrains or "rear ends" as they are often referred, are designated by a size attributable to a ring gear size that may be used within the rear drivetrain. The rear axle housing must be able to accommodate a differential case, differential components, and a ring gear of a specific size for axial alignment and proper function within the rear axle housing. For example, a 9" rear axle housing is deemed such as it is intended for use with a 9" ring gear. The instant embodiments allows for a rear case, differential components and a ring gear of one or more alternate sizes to function with the rear axle housing of a first size. For example, any non-nine (9") inch ring and pinion gear set including but not limited to Ford 8.8, GM 12-bolt, and Dana 60 may be utilized. Additionally, the terms first and second therefore should not be considered limiting—the sizes differ and either the rear axle housing or the rear case, ring gear, or components may be the first size or the second size. Moreover, the two sizes discussed herein should also not be considered limiting as various other sizes may be used within the scope of the embodiments.

Figure 2:
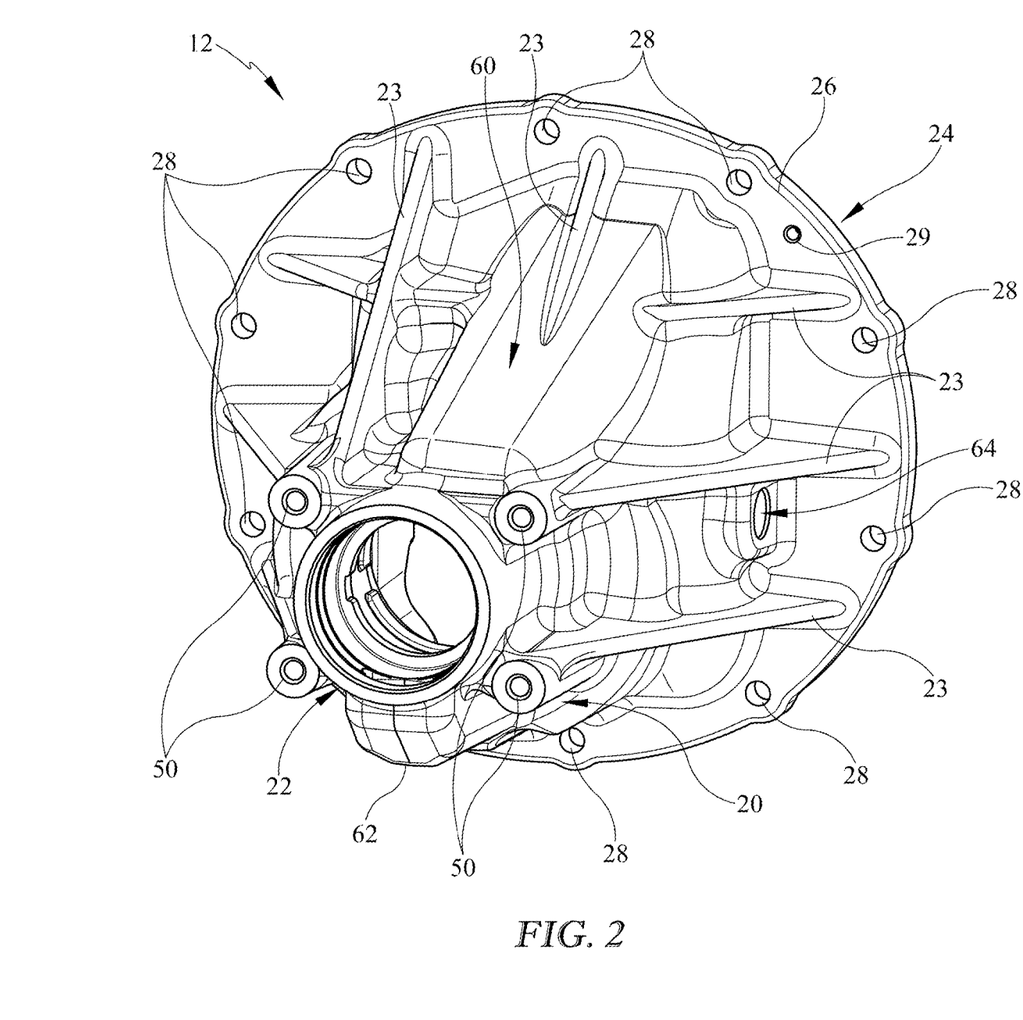
FIG. 2 is a front perspective view of a rear differential case.

Referring now to FIG. 2, a front view of the rear differential case 12 is shown in perspective view. The rear differential case 12 comprises a body 20 having a first end 22 and a second end 24. The body 20 may be formed of cast iron, cast aluminum, alloys, or other lightweight, high strength materials. For example, other materials may include titanium, and carbon fiber structures. The first end 22 is generally oriented toward the drive shaft of the vehicle and receives input via the drive shaft (not shown) to turn a pinion gear 46 (FIG. 6) located within the rear differential case 12. The first end 22 also defines a drive shaft opening where a drive shaft and yoke provide operable connection. The second end 24 comprises a flange 26 and a plurality of bolt holes 28. The bolt holes 28 define a pattern for connection to a rear axle housing of a first size, for example, a 9 inch rear axle housing, deearing caspite the rear differential case 12 being formed to work with components of an alternate size, for example 8.8 inch differential components. Thus, the pattern of the bolt holes 28 on the flange 26 define a pattern intended for use with a specific size rear axle housing 14. The body 20 may further comprise a plurality of strengthening ribs 23 which provide structural support between the flange 26 and the body 20. The ribs 23 may extend in one or more directions.

Also shown on the exterior of the rear differential case 12 are an oil feed channel 60 and an oil return channel 62. The oil feed and return channels 60, 62 provide for oil flow circulation to and from the components within the rear differential case 12. Further, the oil flow circulation allows for oil to flow to pinion bearings 47 along a path between the feed channel 60 and the return channel 62. An oil fill port 64 is located on the body 20 allowing for proper maintenance of oil level. The location of the oil fill port may be desirable for a preselected gear set that differs from that which originally intended for use with the rear axle housing 14.

Further, shown along the flange 26 is at least one jack screw 29. In some embodiments two or more jack screws 29 (FIG. 3) may be utilized.

Figure 3:
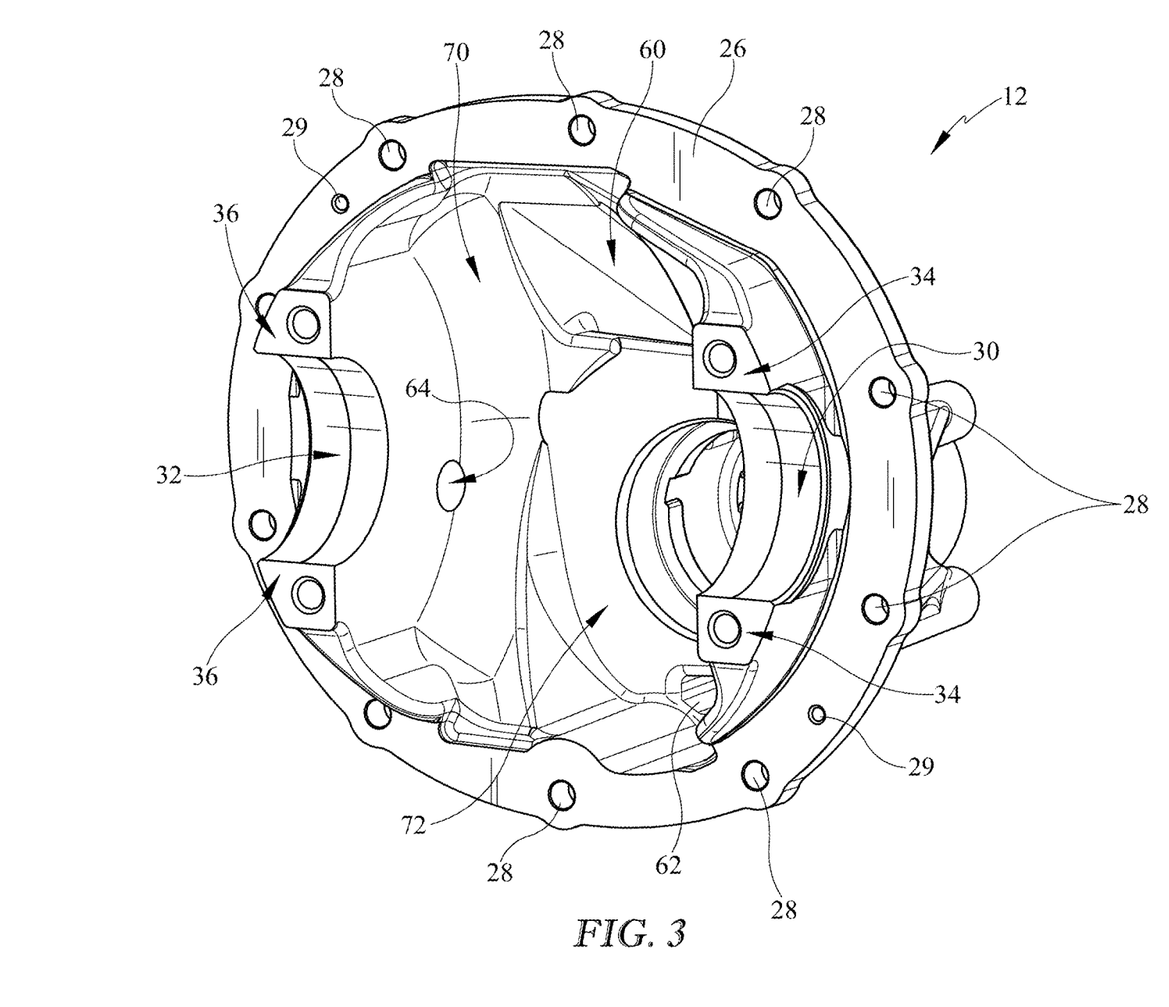
FIG. 3 is a rear perspective view of the rear differential case.
Figure 6:
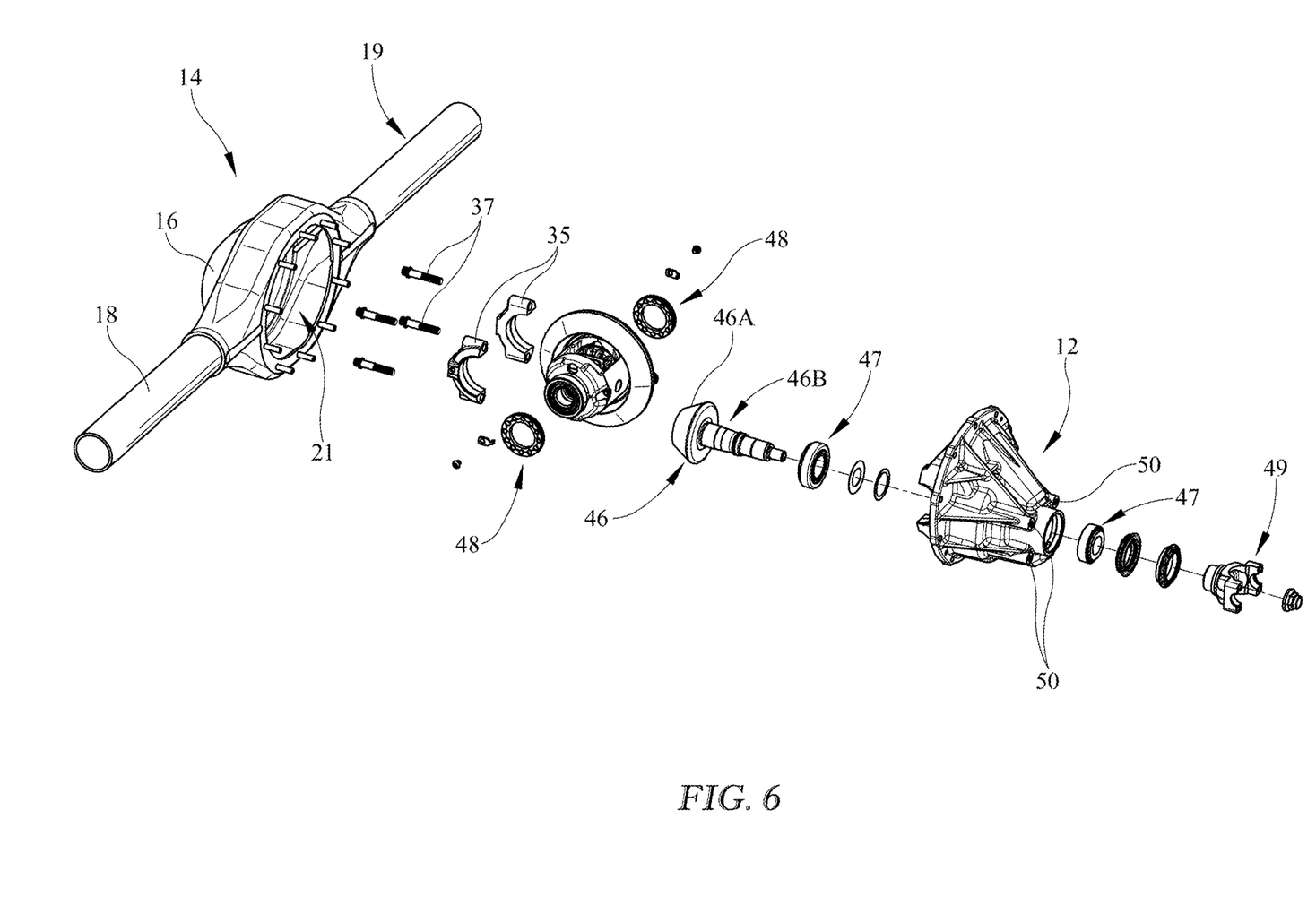

Referring now to FIG. 3, a rear perspective view of the rear differential case 12 is depicted. Within the perimeter of the flange 26 are first and second bearing seats 30, 32. The body 20 also defines a cavity wherein a ring gear and the differential assembly may be located. The bearing seats 30, 32 are arranged so that when bearings are installed, the bearings are coaxial with the first axis $A_1$ extending through the rear axle housing 14, when the rear differential case 12 is installed thereon. Adjacent to the bearing seats 30, 32 are bear cap mounts 34, 36 which each comprise bolt holes allowing mounting of bearing caps 35 (FIG. 6). The bearing caps 35 may be mounted in various manners including but not limited to bolts, studs, through bolts or through studs.

The flange 26 of the rear differential case 12 is sized with a bolt pattern capable of being mounted to a 9 inch rear axle housing 14 as previously discussed. However, the rear differential case 12 is also sized internally to receive into proper axial alignment rear differential components of a different size, for example 8.8 inch ring gear and related components. Thus, the rear differential case 12 is capable of use with a rear axle housing 14 of a first size and with differential components of a second size while maintaining proper axial alignment relative to the first and second axes of the real axle housing 14 and the rear differential case 12.

On the inside of the rear differential case 12, a ring gear cavity 70 is shown. The ring gear cavity 70 may be size to work with various sized ring gears, but in some embodiments may be sized to work with a ring gear of 8.8 inches in diameter, for non-limiting example. Adjacent to the ring gear cavity 70 is a pinion gear cavity 72. A pinion gear 46 (FIG. 6) may be positioned therein to drive rotation of other components disposed within the rear differential case 12.

Figure 4:
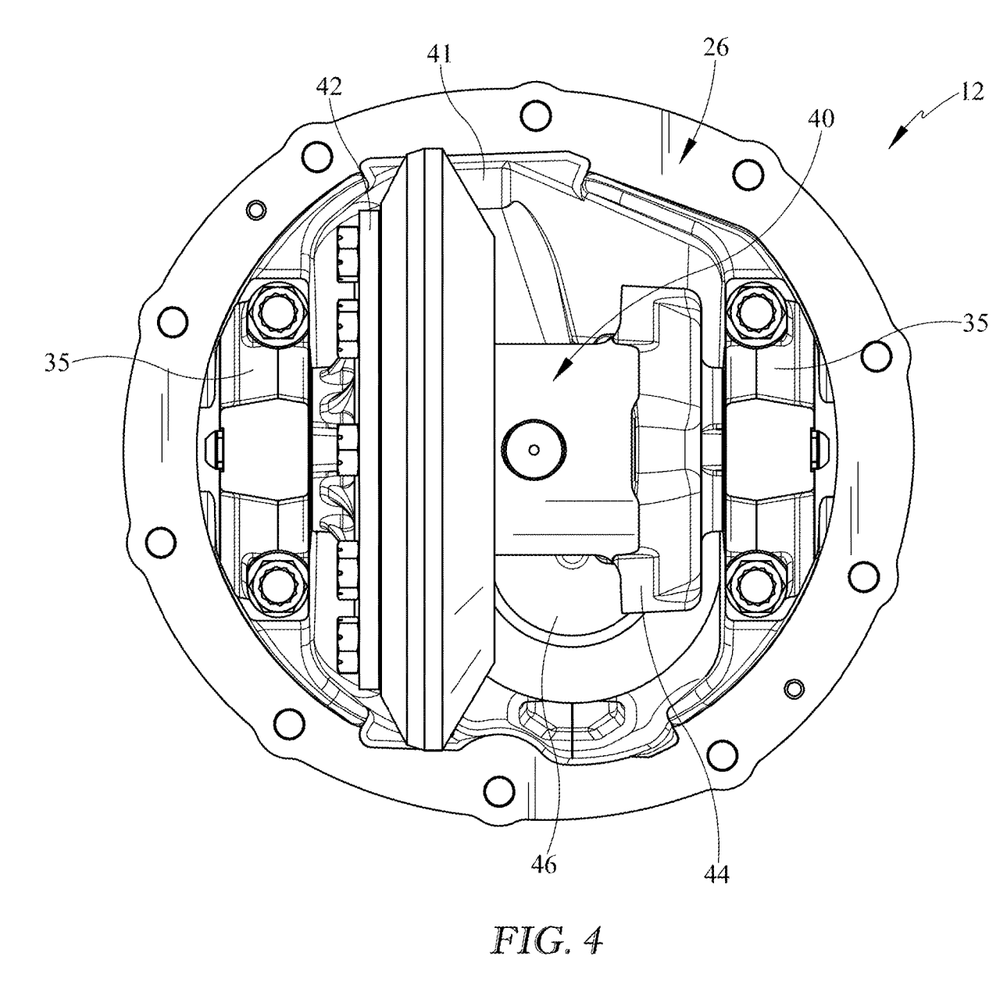
FIG. 4 is a rear view of the rear differential case including the rear differential assembly positioned therein.

Referring now to FIG. 4, a rear view of the rear differential case 12 is shown with a rear differential assembly 40 disposed therein. The rear differential assembly 40 is made up of a plurality of components 41 including a ring gear 42, a differential with a plurality of gears 44, and a pinion gear 46. The differential assembly 40 is rotatably supported by bearings 48 (FIG. 5) located in the bearing seats 30, 32 and captured in place by bearing caps 35. Additionally, the ring gear 42 is shown within the ring gear cavity 70 (FIG. 3) and the pinion gear 46 is shown within the pinion gear cavity 72 (FIG. 3).

Figure 5:
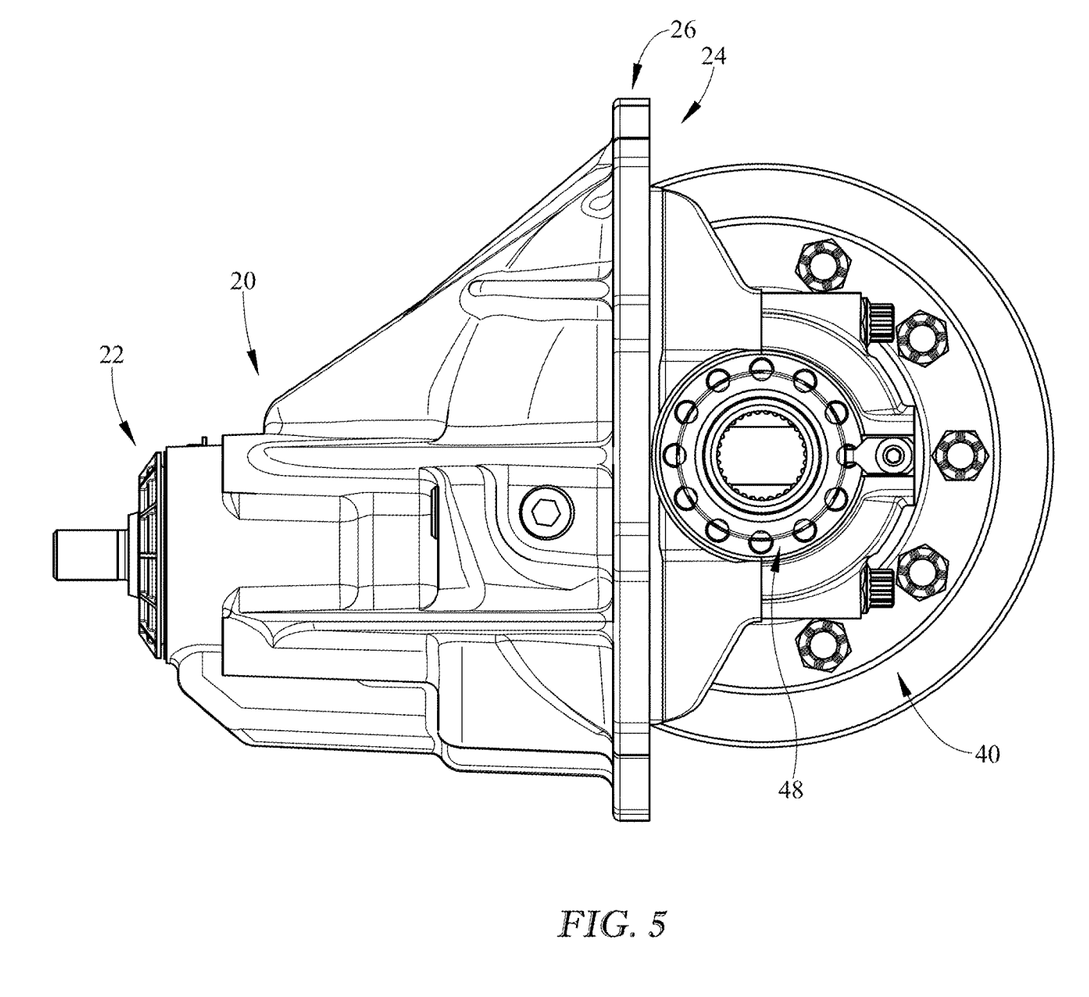
FIG. 5 is a side view of the rear differential case with the differential assembly positioned therein; and, FIG. 6 is an exploded perspective view of the rear drivetrain assembly including the rear axle housing, rear differential case, and components which are located therebetween.

Referring now to FIG. 5, a side view of the assembled rear differential case 12 is shown. The ring gear 42 is shown bolted to the differential assembly 40. The ring gear 42 receives input from the pinion gear 46 causing rotation of the ring gear 42. Additionally, the differential assembly 40 rotates and the gearing components therein will provide a result and output to axles extending from the differential assembly 40 and within the rear axle housing 14 (FIG. 1).

Referring now to FIG. 6, an exploded perspective view of the rear drivetrain 10 is depicted. Starting at the left side of the figure, a rear axle housing 14 is shown. The central portion 16 of the rear axle housing 14 is hollow and opens into the lateral portions 18, 19 wherein axles may be housed. The opening 21 of the central portion 16 allows for receiving of the differential assembly 40 and the rear axle housing 14 is enclosed with the differential assembly 40 positioned therein by the rear differential case 12. Exploded from the rear axle housing 14 are cap bolts 37 which are utilized to connect bearing caps 35 to rear differential case 12. Specifically, the bearing caps 35 are bolted to the bearing seats 30, 32 and fastened in position by the cap bolts 37. The bearing caps 35 retain the differential assembly 40 and related bearings 48 within the rear differential case 12. To the right of the rear differential case 12 is a pinion gear 46 which has a gear 46A and a shaft 46B which extends through a pinion bearing and additional shims and components. These pinion bearing and shims are located within the rear differential case 12 near first end 22 (FIG. 2) and provide rotatable support for the pinion gear 46. At the first end 22 of the rear differential case 12 is an additional pinion bearing which supports rotation of the pinion gear 46 as well as a plurality of seals and a yoke 49. The yoke 49 receives input from a drive shaft, either directly or indirectly, causing rotation of the pinion gear 46.

As the pinion gear 46 rotates, rotation of the differential assembly 40 also occurs which results in rotation to axles extending through the rear axle housing 14 and of the wheels and tires. The differential assembly 40 allows for rotation of each of the wheels associated with the rear axle housing 14 at different speeds, for example to allow for turning which results in the tires moving in different distances and at different speeds.

Referring still to FIG. 6, the first end 22 (FIG. 1) of the body 20 includes a plurality of accessory bosses 50 surrounding the opening wherein the yoke 49 is located. The bosses 50 allow for attachment of additional accessories if desired. For example a torque converter, skid plate, power take off (PTO), or other structures may be utilized in combination with the accessory bolt holes at the first end of the rear differential case.

The rear differential case 12 may have various advantages including but not limited to, a one-piece design rather than multiple pieces defining the case. The one piece design eliminates the need for a bolt on pinion support of some prior art differential cases. Additionally this one piece design eliminates a possible leak path through the connection of the bolt on pinion support. Further, the differential case provides internal oil channels to facilitate internal lubrication of the ring gear and pinion bearings. The flange 26 includes a bolt pattern of holes 28 for use on a rear axle housing 14 size generally sized for a ring gear of differing size than used with the rear differential case 12.

Additionally, more features may be incorporated into the rear differential case 12. For example, an ABS sensor, an oil pump may be incorporated, a sight window for fluid level, cooling fins for internal fluid cooling, oil cooling passages, fluid squirters for component cooling, a ring-gear deflection limiter, and/or other external mounts for suspension brackets.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A rear differential case, comprising:
  a body having a first end and a second end, said first end capable of being oriented toward a drive shaft and said second end capable of being oriented toward a rear axle;
  said first end having an opening configured to receive an input from said drive shaft and defining a first axis through said opening;
  a flange at said second end of said body;
  first and second bearing seats located within said body;
  differential components operably connected to said body, said differential components having 8.8 inch sizing;
  said body sized to receive and locate said differential components and wherein said differential components are configured to be axially aligned for operation by said body within a 9 inch rear axle housing by said first and second bearing seats;

said differential components supported by bearings within said body, said bearings comprising a bearing axis, wherein said first axis is lower than said bearing axis when said body is mounted to said 9 inch rear axle housing; and, a bolt pattern formed in said flange, said bolt pattern sized to be coupled to said 9 inch rear axle housing.

2. The rear differential case of claim 1, said bearings rotatably supporting said differential components including an 8.8 inch ring gear.

3. The rear differential case of claim 2, said ring gear having a rotational axis aligned with an axis of said 9 inch rear axle housing.

4. The rear differential case of claim 1, said differential components further comprising a pinion gear.

5. The rear differential case of claim 1, further comprising a plurality of bosses for connection of an accessory near said first end.

6. A rear axle drivetrain, comprising:
a rear axle housing of a first intended size;
a differential case which is configured to be connected to said rear axle housing, said differential case having bearing seats therein configured to seat bearings;
said differential case having an opening at a first end configured to receive a pinion gear shaft which defines one axis;
said bearing defining a second axis transverse to said one axis, wherein said second axis is positioned higher than said one axis, when said differential case is oriented for operation;
differential components comprising a pinion gear and a ring gear of a second intended size operably connected to said differential case of said first intended size, wherein said ring gear and the pinion gear are capable of respective axial alignments, with said rear axle housing and said differential case, when said differential components are connected to said bearing seats and said differential case is connected to said rear axle housing of said second intended size; and,
wherein the differential case is capable of receiving said differential components of said second intended size, and said differential case is configured to be connected to said rear axle housing of said first intended size for operation of said differential components of said second intended size within said rear axle housing of said first intended size.

7. The rear axle drivetrain of claim 6, further comprising bearing caps which fasten to said differential case.

8. The rear axle drivetrain of claim 7, said bearing caps and said differential components being disposed in said rear axle housing when said differential case is fastened to said rear axle housing.

9. The rear axle drivetrain of claim 6, said differential components being aligned with lateral portions of said rear axle housing.

10. The rear axle drivetrain of claim 9, said pinion gear being aligned with a drive shaft opening of said first end of said differential case.

11. The rear axle drivetrain of claim 6, said differential case having at least one aperture for a jack screw.

12. A method of installing a differential case and rear axle housing, comprising the steps of:
providing said differential case of a first size and said rear axle housing of a second size differing from the first size, said differential case defining one axis which is extending through a drive shaft opening;
connecting a differential assembly of a first size at least partially within said differential case, said differential assembly supported by bearings defining a second axis, which is higher than said one axis;
positioning said differential case and said differential assembly on said rear axle housing of a second size that differs from said first size; and,
connecting said differential case to said rear axle housing wherein said differential assembly is housed within said rear axle housing and operably aligned for operation within said rear axle housing by bearing seats and a flange of said differential case.

13. The method of claim 12, connecting bearing caps to said differential case.

14. The method of claim 13, capturing said differential assembly between said bearing caps and said differential case.

15. The method of claim 12, further comprising removing the differential case and the differential assembly with a ring gear of a second size from the rear axle housing.

16. The method of claim 15, replacing said differential assembly with a second ring gear of said first size.

* * * * *